United States Patent
Kaufmann et al.

(10) Patent No.: US 8,864,865 B2
(45) Date of Patent: Oct. 21, 2014

(54) AIR FILTER ELEMENT, FILTER HOUSING AND FILTER ARRANGEMENT

(75) Inventors: Michael Kaufmann, Meckenheim (DE); Klaus-Dieter Ruhland, Meckenheim (DE)

(73) Assignee: Mann+Hummel GmbH, Ludwigsburg (DE)

( * ) Notice: Subject to any disclaimer, the term of this patent is extended or adjusted under 35 U.S.C. 154(b) by 66 days.

(21) Appl. No.: 13/524,477

(22) Filed: Jun. 15, 2012

(65) Prior Publication Data

US 2012/0317939 A1 Dec. 20, 2012

(30) Foreign Application Priority Data

Jun. 15, 2011 (DE) .................. 10 2011 106 503

(51) Int. Cl.
| | | |
|---|---|---|
| *B01D 46/00* | (2006.01) | |
| *B01D 46/42* | (2006.01) | |
| *B01D 46/24* | (2006.01) | |
| *F02M 35/024* | (2006.01) | |
| *F02M 35/02* | (2006.01) | |

(52) U.S. Cl.
CPC ........ *B01D 46/0005* (2013.01); *B01D 46/4227* (2013.01); *B01D 46/2414* (2013.01); *F02M 35/02425* (2013.01); *F02M 35/02416* (2013.01); *B01D 46/2411* (2013.01); *B01D 2265/021* (2013.01); *B01D 2265/029* (2013.01); *F02M 35/0203* (2013.01)
USPC .................... 55/498; 55/501; 55/502; 55/503; 55/504; 55/505; 95/273; 96/226

(58) Field of Classification Search
USPC ........... 55/493, 498, 502, 492, 482, 478, 357, 55/385.1, 496; 96/226; 95/273
See application file for complete search history.

(56) References Cited

U.S. PATENT DOCUMENTS

| | | | |
|---|---|---|---|
| 4,588,426 A | 5/1986 | Virgille et al. | |
| 6,391,073 B1 | 5/2002 | Koga | |
| 8,475,556 B2 * | 7/2013 | Kori et al. ........................ 55/482 |
| 2006/0254229 A1 * | 11/2006 | Schrage et al. ................. 55/498 |
| 2011/0283669 A1 * | 11/2011 | Scott et al. ...................... 55/498 |
| 2012/0247340 A1 * | 10/2012 | Williams et al. ................ 96/226 |
| 2012/0317943 A1 * | 12/2012 | Kaufmann et al. ............. 55/492 |
| 2013/0199138 A1 * | 8/2013 | Scott et al. ...................... 55/478 |

FOREIGN PATENT DOCUMENTS

| | | |
|---|---|---|
| DE | 60316176 T2 | 5/2008 |
| JP | S54125910 U | 9/1979 |
| JP | S61105754 U | 7/1986 |
| JP | 2008188489 A | 8/2008 |
| WO | WO0056423 A1 | 9/2000 |
| WO | WO2004039476 A1 | 5/2004 |

OTHER PUBLICATIONS

German Office Action on priority application DE 10 2011 106 503.6.
German Office Action on priority application DE 10 2011 106 503.6, Apr. 30, 2012.

* cited by examiner

*Primary Examiner* — Duane Smith
*Assistant Examiner* — Minh-Chau Pham
(74) *Attorney, Agent, or Firm* — James Hasselbeck

(57) ABSTRACT

An air filter element (10) with a cylindrical central pipe (11) is provided wherein at one end of the central tube (11) a device (18) for transmission of torque from a tool to the air filter element (10) is provided and at the other end of the central tube (11) a fastening device (14) for detachably mounting the filter element (10) in a cylindrical support body (21) by means of an insertion/rotation movement is provided.

12 Claims, 6 Drawing Sheets

AIR FILTER ELEMENT, FILTER HOUSING AND FILTER ARRANGEMENT

CROSS REFERENCE TO RELATED APPLICATIONS

This application claims the benefit under 35 USC 119 of foreign application 10 2011 106 503.6 filed in Germany on Jun. 15, 2011, and which is hereby incorporated by reference in its entirety.

TECHNICAL FIELD

The present invention concerns a filter element for filtering air, a housing for such a filter element, as well as a filter arrangement with such a filter element and housing.

BACKGROUND OF THE INVENTION

Filter elements are used for filtering fluid flows or gaseous media. For example, they are used for filtering an air flow that is guided into a passenger compartment of a motor vehicle. For this purpose, they can be used in particular in an air-conditioning device mounted in a motor vehicle in order to clean ambient air from health-hazardous substances, odors or the like. Examples of such filters are particle filters, odor filters or combinations thereof. A further field of use of filter elements is air filters that remove suspended particles from the air that is supplied to an internal combustion engine. Generally, such air filters have a housing in which an exchangeable air filter element is provided.

U.S. Pat. No. 4,588,426 discloses an air filter with a filter housing having at its bottom several vertically arranged rods. A filter element can be pushed onto the rods and the filter housing can be closed by a cover. The cover is screw-connected by means of a wing bolt that extends to the bottom of the filter housing. The exchange of the filter element can be realized thus in a simple way because the cover can be removed by simply releasing the wing bolt and the filter element can be exchanged by hand without this requiring an additional tool. However, it is often desirable that such a simple exchange without tool is actually not made possible because it carries the risk that the filter element is exchanged by the consumer in an inappropriate way or by a using wrong filter element. This, in turn, can cause an insufficient filtering action or can cause the filter material to wear faster.

WO 00/56423 A1 discloses an air filter with two cup-shaped housing shells that are detachably connected to each other, wherein the lower one of the shells has a conical support pipe integrated therein. Onto this support pipe, a conical round filter element is pushed and subsequently the top housing shell is placed onto the lower housing shell and is screw-connected with one end of the support pipe. In this air filter the housing shells are screw-connected to each other so that a release without tool is not possible, but the screw connection can be realized by a screwdriver so that here there is also the risk of improper exchange of the filter element with the aforementioned disadvantages.

SUMMARY OF THE INVENTION

An object of the present invention is to provide an improved air filter element, a filter housing for such a filter element as well as a filter arrangement that are of a simple configuration and can be produced easily and, at the same time, ensure that the filter element received in the filter housing cannot be exchanged, or exchanged only with difficulty, without a tool, in particular a special tool.

Accordingly, an air filter element is provided with a cylindrical central tube wherein at one end of the central tube a torque transmission device for transmitting torque from a tool onto the air filter element is provided and at the other end of the central tube a fastening device for detachably mounting the filter element in a cylindrical support body by means of an insertion/rotation movement is provided.

Examples for connections by means of an insertion/rotation movement are screw connections, bayonet connections, locking connection and/or snap connections. An advantage of insertion/rotation connections compared to insertion/locking connections is that they release less easily as a result of vibrations which is advantageous in particular for use in trucks, construction machinery, agricultural machines and the like. The installed air filter element cannot be removed, or removed only with difficulty, by hand from the support body because it is received in the support body and therefore its outer circumference is covered by the support body. In this way, the support body can provide in particular also a mechanical protection of the filter element with respect to damages. This can be important in particular in connection with portable devices where a stable positioning of the device during filter exchange cannot always be ensured and therefore the risk of damage of filter elements exists when the devices drop to the ground with the filter housing being open. The combination of fastening means with the torque transmission device provides a filter element which by means of a tool can be attached to and removed from a support body with a simple movement but, without a tool, can be attached or released only with difficulty.

With an appropriate configuration of the tool, it is sufficient for transmission of torque when at the end of the filter element a section is provided as a torque transmission device that is not of rotational symmetry. The torque transmission device can be designed relative to the cylinder axis of the central tube as a projection or recess that is not of rotational symmetry. For example, on a cover that closes off the central tube a polygonal recess can be provided or beads or projections on the cover can be provided that enable a screwing-in action by means of a tool.

At one end of the central tube an end disk can be provided that has a tub-shaped recess that is provided at its bottom with the torque transmission device. In this context, a tub-shaped recess is to be understood as a recess of a blind bore shape having a diameter that is greater than its depth. The torque transmission device can be designed in particular as a projection that rises from the bottom of the recess in the end disk but is positioned below the upper rim of the end disk. The projections that are provided in the recess of the end disk serve as means of transmitting torque of a tool especially designed for this. Because these projections are provided in a recess, they are not suitable for unscrewing or removing the air filter element by hand from the support body. In this way, it can be ensured that the air filter element cannot be removed, or removed only with difficulty, from the support body without a special tool, and an improper exchange of the air filter element can be prevented. The tub-shaped recess, when viewed from above, can be of a circular shape; this facilitates the use of the tool.

The lateral surfaces of the projections can define a substantially right angle, i.e., an angle of 75 to 105 degrees with the bottom surface of the recess. Moreover, the recess, when viewed from above, can be circular. The lateral surfaces of the projections can substantially extend in radial direction from the rim of the recess in the direction toward the cylinder axis of the central tube. Accordingly, a large contact surface between the special tool and the projections can be ensured and sliding off of the special tool from the projections can be avoided.

The air filter element can be provided, for example, with at least two projections. The projections can moreover be provided opposite each other on the rim of the recess. Accordingly, relatively short projections can be used as means of transmitting torque of a special tool; this makes a removal of the air filter element by hand even more difficult.

For example, the length of the lateral surfaces of the projections extending in radial direction can be less than half the radius of the recess. The projections can be provided, for example, so as to be located opposite to each other on the rim of the recess. This enables an efficient transmission of torque onto the air filter element.

The end disk and the central tube can be monolithically configured. This enables a simple and inexpensive manufacture of the filter element without additional seals, for example, by injection molding.

Accordingly, a filter housing for receiving the above described air filter element is provided that comprises a housing top part and a housing bottom part that is detachably connected to the housing top part, wherein on the housing bottom part an air-permeable cylindrical support body is provided that has at its end that is facing the housing bottom part housing-associated fastening means interacting with the filter-associated fastening devices of the air filter element for attachment of the air filter element by means of an insertion/rotation movement.

The housing bottom part can be configured monolithically together with the cylindrical support body. This provides, on the one hand, a greater pressure resistance and ensures, on the other hand, improved handling during installation or removal. Moreover, the filter housing can thus be produced in a simple and inexpensive way.

The cylindrical support body can be designed as an air-permeable grid structure. This provides a relatively high stability of the support body wherein the relatively large outer surface of the support body can be used for the air flow through the filter.

The two housing shells (housing top part and housing bottom part) can be held together, for example, by means of a buckle or a detachable screw connection.

In one embodiment, for opening the housing, the housing top part can be pivoted and folded open about a pivot bearing that is arranged between housing top part and housing bottom part so that the support pipe becomes accessible.

In one embodiment, an air inlet opening for a cyclone filter stage is provided in particular laterally on the housing top part and/or the housing bottom part. The cyclone filter stage is preferably integrated as a preseparator into the housing part or parts. The cyclone filter stage is in particular formed by means of at least one inline cyclone cell that comprises a pipe provided with an inlet-side deflection means for imparting a rotational movement to the air flow and an outlet-side immersion pipe for separating the radially outwardly located flow areas with higher particle proportion as well as a discharge opening for discharging the thus separated particles. The cyclone filter stage is arranged especially preferred such that the flow exiting from it is not directly oriented onto a filter element but flow past it. In this way, a more uniform loading of the filter element can be achieved. It is further preferred that the flow that is exiting from the cyclone filter stage can flow past the second filter element and can be directed onto a housing wall that is positioned opposite the cyclone filter stage. This can also contribute to a more uniform inflow at the filter elements, in particular when only a minimal number of inline cyclones are used as a cyclone filter stage.

In one embodiment of this filter arrangement, the filter element is completely received with positive fit in the support body. For such a complete reception of the filter element in the support body, the support body surrounds the filter element externally so that the upper end of the filter element is positioned below the top edge of the support pipe. Accordingly, the upper end of the filter element does not project from the support pipe so that the upper end of the filter element also cannot be gripped by hand and removal without a tool is not possible or possible only with difficulty.

In a further embodiment of the filter arrangement, a second cylindrical filter element is provided moreover. The second filter element has preferably a zigzag-shaped folded filter bellows of a fibrous filter medium that is closed to a ring. The support body forms in particular a central tube of the second cylindrical filter element so that a radial support of the filter bellows relative the interior can be ensured. Accordingly, a multi-stage filtration can be realized wherein the second filter element is preferably flowed through first from the exterior (raw side) to the interior (clean side) and serves as a main filter element for filtration of relatively large particles and the first filter element as a secondary filter element serves for filtration of relatively small particles. In this connection, the first filter element can be secured by means of an insertion/rotation movement. The second filter element can be configured to be pushed onto the support body. When the support body forms a central tube of the second filter element (main filter element), this second filter element can be of a simpler configuration because it must not have its own central tube. The second filter element can be designed to be pushed onto the first filter element or the support body, i.e., can be mounted and removed without a tool. Preferably, the second filter element has an end disk with an outflow opening and a seal which serves for sealing relative to the first filter element or the support body. This seal is preferably designed as a radial seal that is of an annular configuration and can engage a cylindrical sealing surface of the first filter element or the support body such that the raw side is separated from the clean side. It is further preferred that the second filter element has a second closed end disk.

Further possible implementations of the invention comprise also combinations that are not explicitly described of features or embodiment variants described above or in the following in respect to the embodiments. In this connection, a person of skill in the art will also add individual aspects as improvements or supplements to the respective basic form of the invention.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

In the Figures the same or functionally the same elements, if nothing else is indicated, are provided with the same reference characters.

Figure 1:
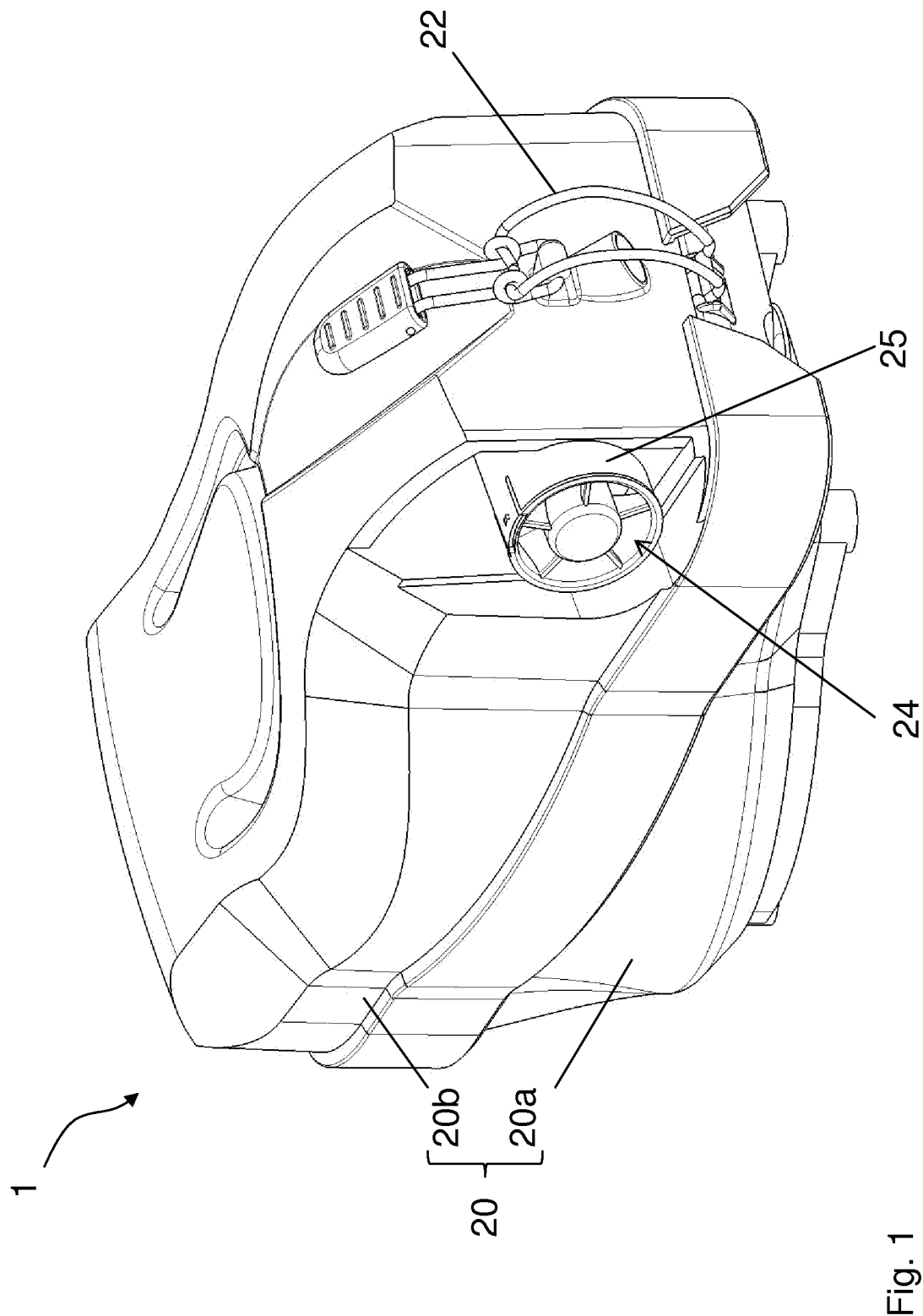
FIG. 1 is a perspective view of a filter arrangement, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter element for filtering air, a housing for such a filter element, as well as a filter arrangement. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The invention will be explained in the following with the aid of a filter for the combustion air of an internal combustion engine, for example, a motor vehicle. Instead of being designed for filtering air, corresponding filter elements can be designed, for example, for filtering another gaseous or even liquid medium, for example, oil.

Figure 2:
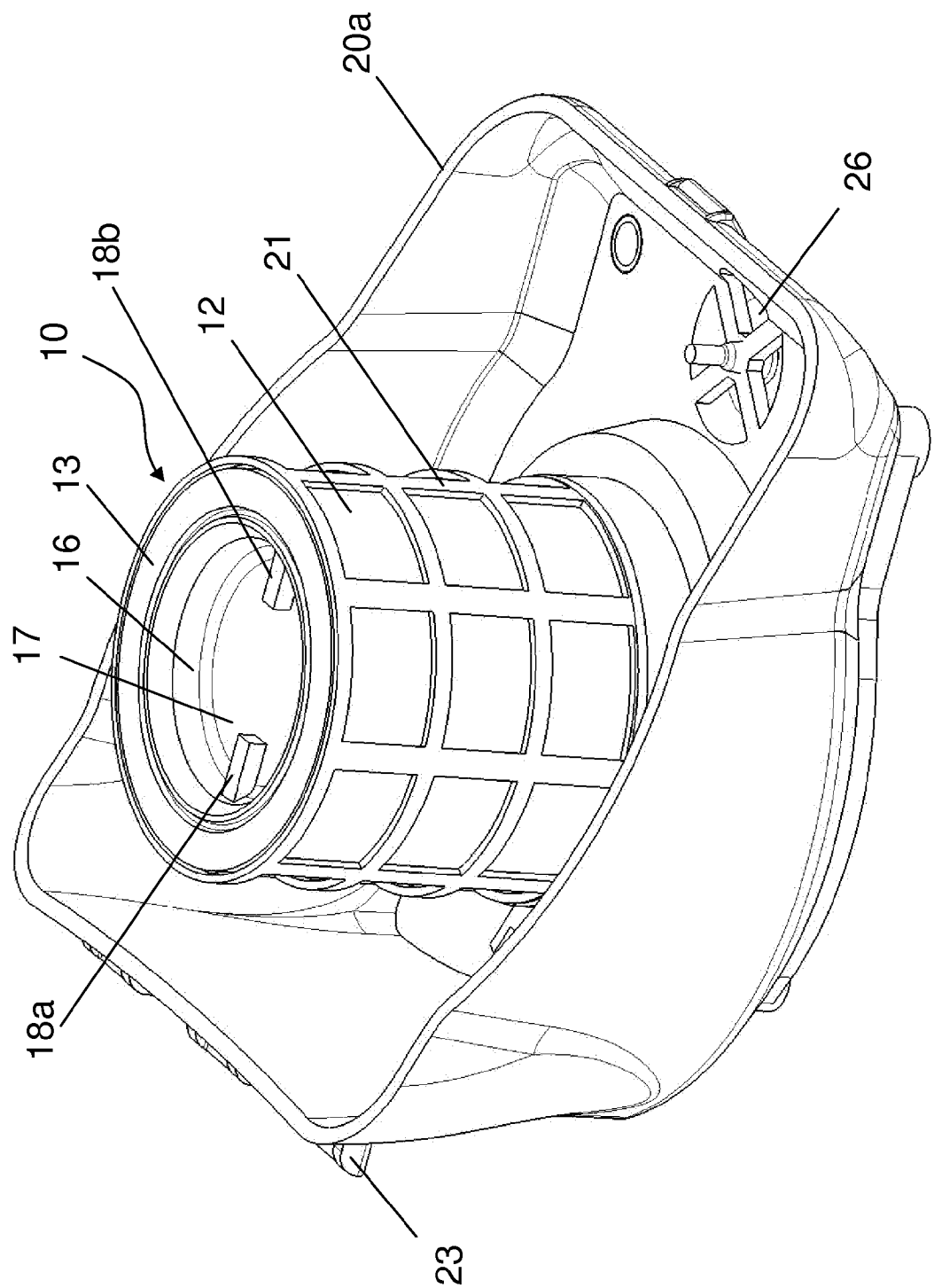
FIG. 2 is a perspective view of a filter element as well as of a bottom housing shell in which the filter element is installed, consistent with the present invention.
Figure 3:
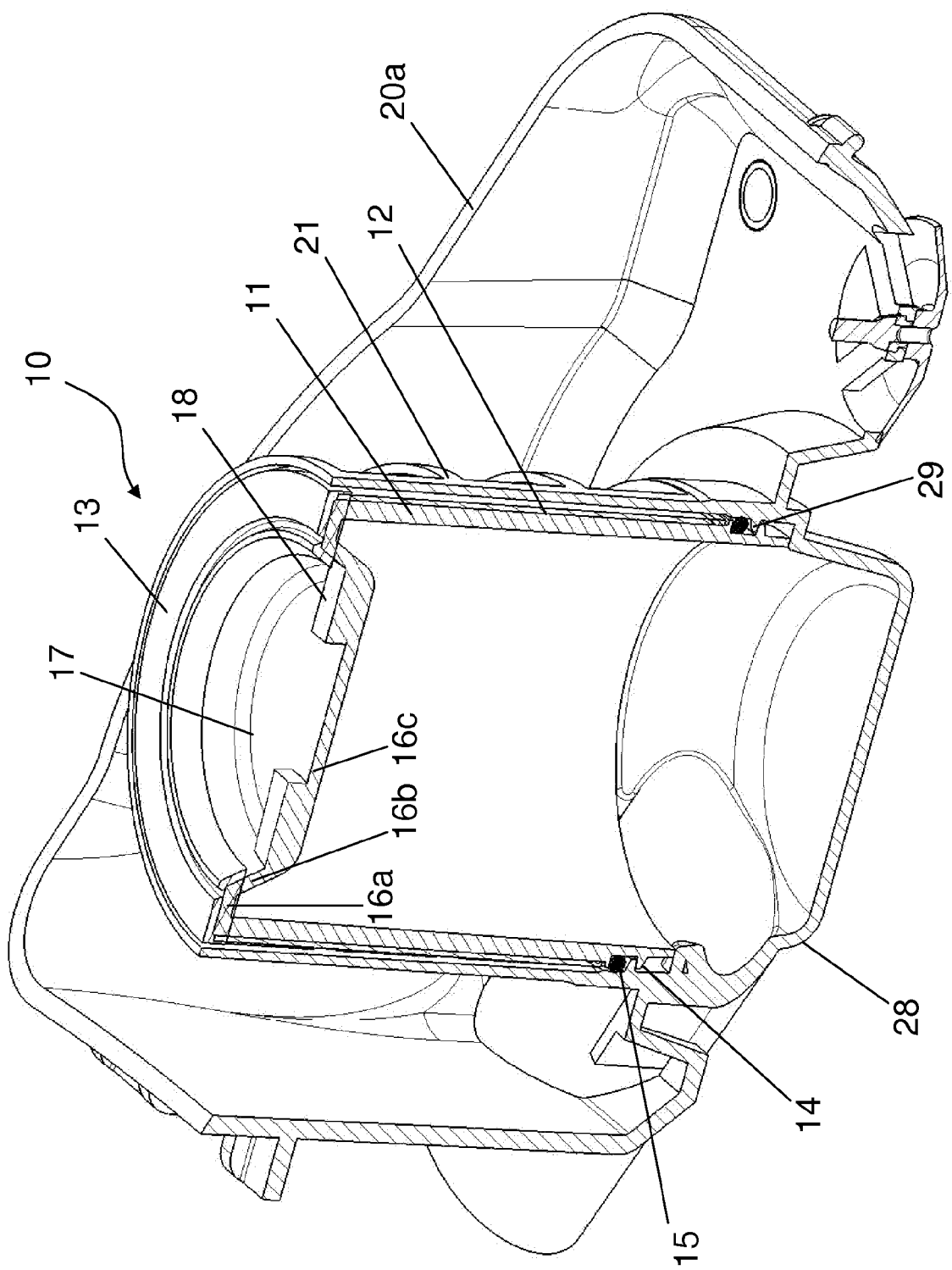
FIG. 3 is a sectioned view of the filter element and of the housing shell of FIG. 2.
Figure 4:
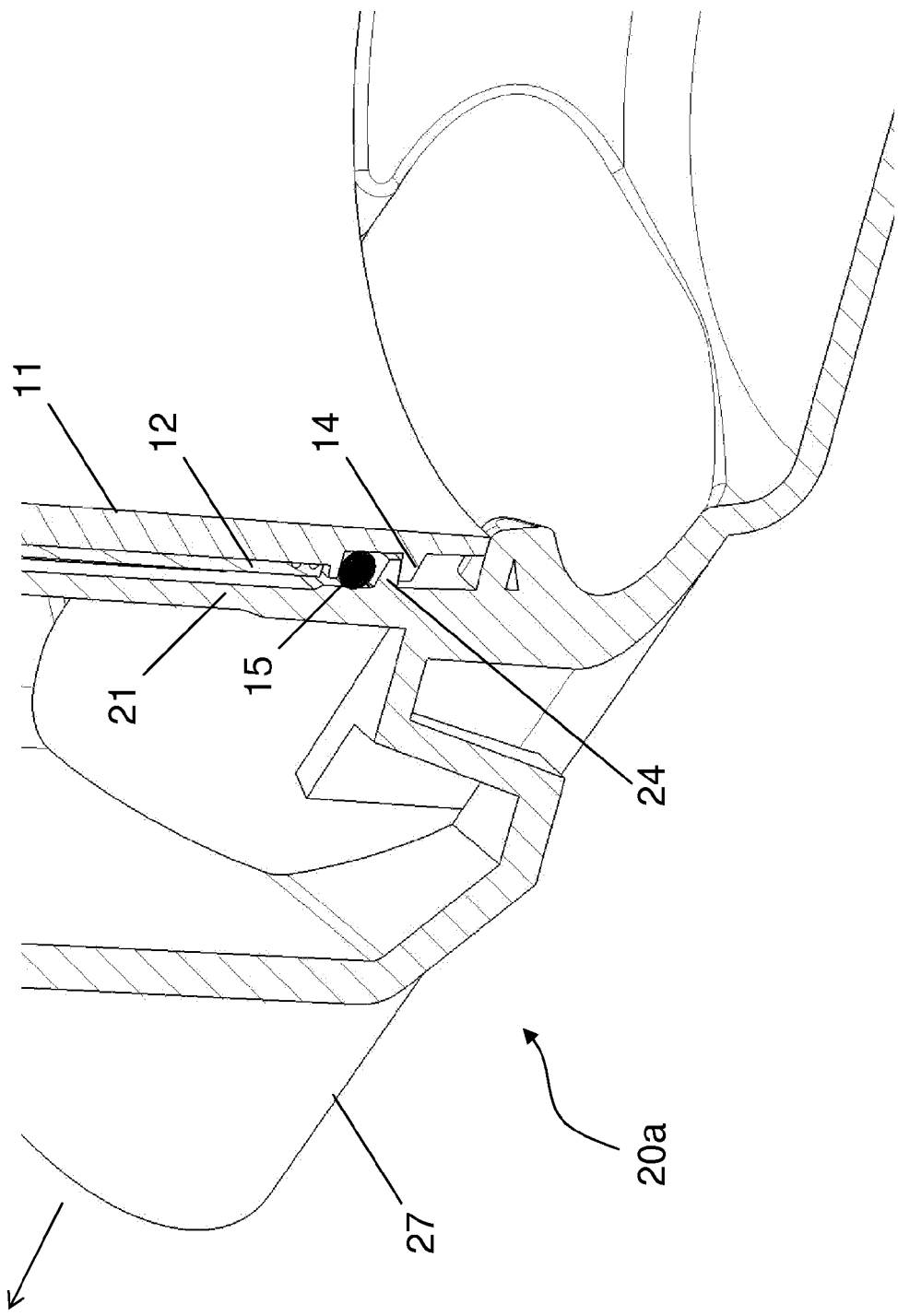
FIG. 4 is a detail view of the connection of the filter element with the housing shell.
Figure 5:
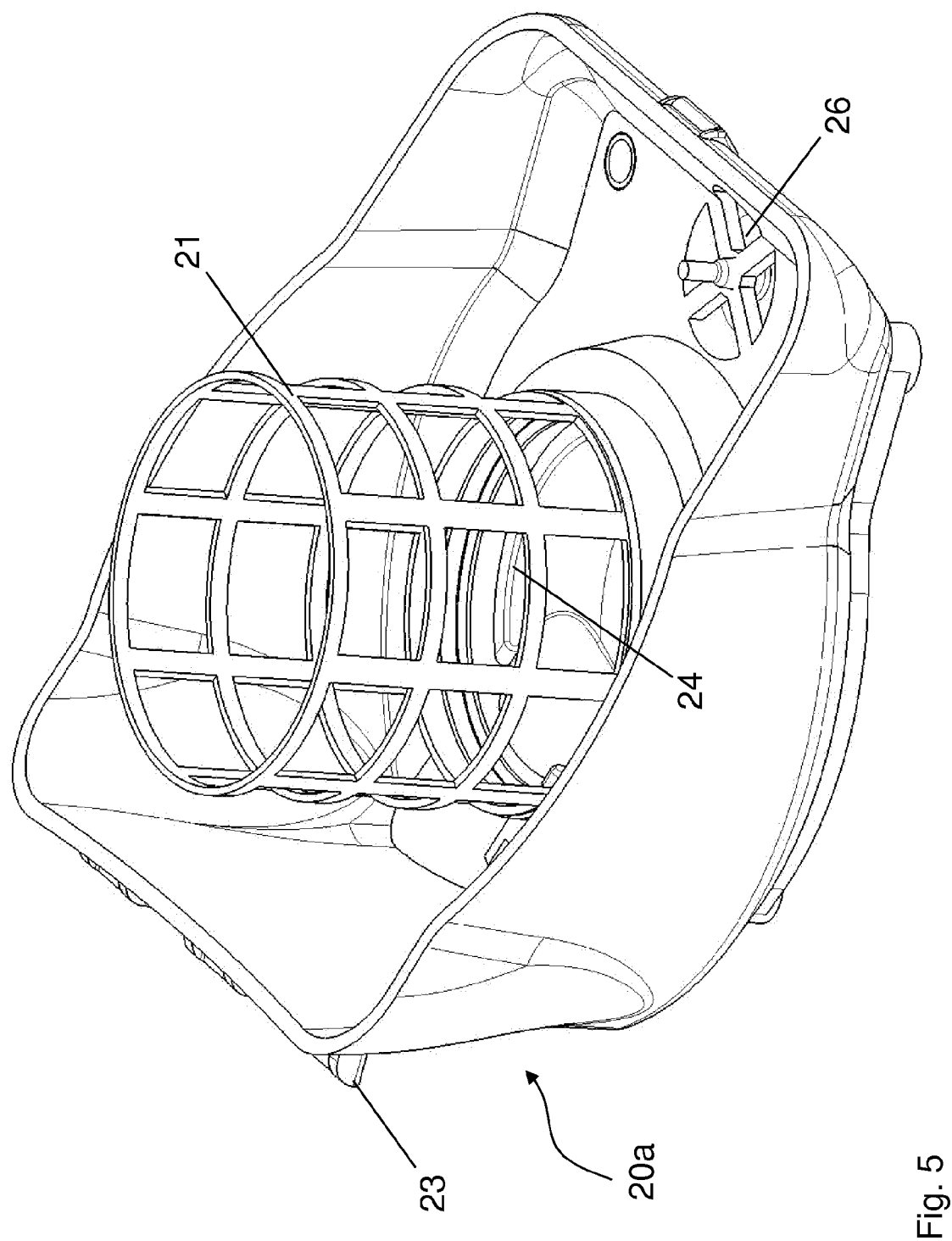
FIG. 5 is a perspective view of the bottom housing shell of the filter housing.

In the following, with the aid of FIGS. 1 to 5, a filter arrangement 1 with a filter element 10 according to one embodiment is disclosed. FIG. 1 is a perspective view of a filter arrangement 1. FIG. 2 is a perspective view of bottom housing shell 20a of a fluid-tight housing 20 of the filter arrangement in which the filter element 10 is installed. FIG. 3 is a sectioned view of the filter element 10 and of the housing shell 20a in FIG. 2. FIG. 4 shows in a detail view the connection of the filter element 10 with the housing shell 20a. FIG. 5 is a perspective view of the bottom housing shell 20a of the filter housing 20.

It should be noted that the expressions "top" and "bottom" relate in this context to the orientation in the Figures and not necessarily to the orientation of the filter arrangement 1 in the mounted state.

The filter arrangement 1 of this embodiment embodied as an air filter has a filter element 10 (compare FIGS. 2 to 4) which is received in a filter housing 20 of plastic material or the like. The filter housing 20 has a bottom housing shell 20a with a support 21 and a top housing shell 20b.

The two housing shells 20a and 20b can be held together by means of a buckle 22. When the buckle 22 is open, the housing shell 20b can be pivoted and folded open about a pivot bearing 23 that is provided at the upper end of the rear wall of the bottom housing shell 20a so that the support tube 21 is accessible. In the support tube 21, in the way to be described in detail below, the filter element 10 is received and secured.

An air inlet opening 24 for a cyclone filter stage 25 is provided laterally at the top housing shell 20b. The cyclone filter stage 25 is integrated into the top housing shell 20b. Through the air inlet opening 24, the air from which the particles are to be removed by filtering is conveyed into the cyclone filter stage 25. In the cyclone filter stage 25, particles are first separated from the air by means of cyclone separation. The particles can be removed by means of a discharge opening 26. The cyclone filter stage is in particular formed by at least one inline cyclone that is provided with a pipe having deflection means at the inlet side for imparting a rotational movement to the air flow and an outlet-side immersion pipe for separation of radially outwardly located flow areas with higher particle proportion. The cyclone filter stage is arranged particularly preferred such that the flow exiting from it is not oriented directly onto a filter element but flows past it. In this way, a more uniform loading of the filter element can be achieved. It is further preferred that the flow that is exiting from the cyclone filter stage flows past the second filter element and is directed onto a housing wall that is positioned opposite the cyclone filter stage. This can also contributed to a more uniform inflow at the filter elements, in particular when only a minimal number of inline cyclones are used as a cyclone filter stage.

The thus pre-cleaned air then passes through the filter element that is provided in the support pipe 21 and is purified by the filter material provided therein. The purified air leaves the housing finally through an air outlet socket 27 (compare FIG. 4) at the bottom of the bottom housing shell 20a below the support pipe 21. The purified air can be supplied to an internal combustion engine of a motor vehicle or the like.

As can be seen in particular in FIG. 3, the filter element 10 comprises a cylindrical central tube 11 whose cylindrical outer surface is surrounded by a filter material 12 attached by a first seal 13 on the upper end of the central tube 11. The filter element 10 is fitted into the support pipe 21. The support pipe 21 is a cylindrical grid-shaped support body which is formed monolithically with the bottom housing shell 20a. The lower end of the support pipe 21 adjoins in this connection a cup-shaped section of the bottom housing shell 20a that is formed at the bottom of the bottom housing shell 20a so that the filter arrangement 1 is provided with greater stability.

At its lower end, the central tube 11 has fastening means for fastening the filter element 10 at the housing shell 20a. This fastening means at the filter is formed in the illustrated embodiment as a thread 14. Between the thread 14 and the filter material 12 a second seal 15 is arranged. The fastening means at the filter interact with fastening means at the housing in order to secure the filter element 10 in the support pipe 21. More precisely, at the housing at the lower end of the support pipe 21 a thread 29 is provided. The filter element 10 can thus be secured in the support pipe 21 by means of an insertion/rotation movement. In this connection, it is first pushed in axial direction into the support pipe 21 until the filter-associated thread 14 rests on the housing-associated thread 29. By rotation of the filter element 10, the filter element 10 is screw-connected to the support pipe 21. The threads 14 and 29 must not be provided about the entire circumference of the central tube 21 or the support tube 21 but can also be formed as several section-wise projections along the circumference. In particular, the threads 14 and 29 can be formed such that the filter element 10 by rotation about a relatively small angle, for example, an angle not greater than 90 degrees or not greater than 45 degrees, can be secured in the support pipe 21. In this way, a fast fixation of the filter element 10 is possible. Instead of the above described screw connection, the filter element 10 can be secured also by means of a bayonet, locking and/or snap connection in the support pipe 21. Even for such connections, the filter element 10 is secured by an insertion/rotation movement in the support pipe 21.

At the upper end of the central tube 11, an end disk 16 is provided that closes off air-tightly the central tube 11. In the illustrated embodiment, the central tube 11 and the end disk 16 are of a monolithic configuration but it is also possible to provide the end disk as a separate element. In the end disk 16 the tub-shaped recess 17 is provided that, in the illustrated embodiment, has the shape of an upside-down circular truncated cone. The end disk 16 has a first annular section 16a that adjoins the cylindrical wall of the central tube 11 and extends at a right angle thereto radially in inward direction. A second annular section 16b adjoins the inner end of this annular section 16a and defines together with the first annular section 16a an angle of, for example, 110 to 160 degrees, for example, approximately 135 degrees. A disk-shaped third section 16c adjoins this second section 16b and forms together with the second section 16b the recess 17. The first seal 13 is also of an annular shape and surrounds the first section 16a of the end disk as well as the end of the filter material 12 that is placed thereon so that the filter material 12 is secured at the end of the central tube 11. Foam of polyurethane (PU) or PUR foam can be used as a material for the first seal 13.

The air filter element 10 is provided with a torque transmission device for transmitting torque from a tool onto the air filter element. For this purpose, at the inner rim of the recess 17, i.e., at the location where the second section 16a meets the third section 16c, at least one projection 18 extending in radial direction is provided. In the illustrated embodiment, as a torque transmission device two projections 18a and 18b are provided which extend from the rim of the recess 17 to a location that is approximately at the center between the rim of the recess 17 and the center of the end disk 16. These projections 18a and 18b form projections that project from the bottom of the recess 17 up to a height that is below the upper rim of the end disk 16. In the embodiment illustrated in FIG. 2, the two projections 18a and 18b are substantially of a parallelepipedal shape and are positioned at opposed locations of the rim, i.e., displaced by an angle of 180 degrees.

By means of the projections 18a and 18b, the filter element 10 can be mounted on or removed from the support pipe 21. For mounting, the filter element 10 is pushed in the afore described way into the support pipe 21 until the threads 14 and 29 rest on each other. With a special tool that is not disclosed in detail, the filter element 10 can now be turned and secured. For this purpose, the special tool is inserted into the recess 17 and turned so that it is laterally forced against the lateral surfaces of the projections 18a and 18b. The projections 18a and 18b absorb the torque of the special tool and transmit the torque to the filter element 10. There is no limitation with regard to the configuration of the special tool, aside from the limitation that it must be suitable to transmit torque to the projections 18a and 18b. For example, at the end of the special tool a rectangular blade, similar to that of a screwdriver, can be provided. However, it is also possible that the shape of the special tool is matched to the recess 17, i.e., has the shape of a truncated cone with recesses for the projections 18.

When, for example, in connection with maintenance, the filter element 10 is to be released from the support pipe 21, the special tool is required also for this purpose. In the state in which it is completely received in the support pipe 21, the filter element 10 is surrounded by the grid-shaped support pipe 21 so that it cannot be gripped by hand and unscrewed. On the upper end, there is also no point of attack with which, without a tool, torque can be transmitted onto the filter element 10. Accordingly, the filter element 10 cannot be secured in or released from the support pipe 21 by hand, or secured and released only with difficulty. In this way, a proper exchange of the filter element 10 is ensured because the required special tool in general is available only at authorized repair shops or dealerships or to appropriately authorized or trained maintenance personnel.

The lateral surfaces of the projections 18 define an angle of, for example, 75 to 105 degrees and preferably substantially 90 degrees relative the bottom of the recess. The lateral surfaces of the projections 18 extend substantially in radial direction from the rim of the recess 17 in the direction of the cylinder axis of the central tube 11. Accordingly, a large contact surface between the special tool and the projections 18 can be ensured and sliding off of the special tool from the projections 18 is avoided. Moreover, by providing the projections 18 at the rim of the recess, i.e., removed as far as possible from the axis of rotation, an efficient torque transmission is ensured.

The filter housing 20 of this embodiment can be opened and closed without a tool. The buckle closure enables in this connection a fast one-hand operation. Since the support pipe 21 is of a grid-shaped configuration and extends up to the end of the filter element 10, it is not possible to mount and remove the filter element 10 without a tool, as described above. Accordingly, a special tool for mounting and removing the filter element 10 is required; this ensures proper maintenance work. However, this can be done with a few manipulations because the filter housing 20 can be opened with one hand and the filter element 10 can be secured with a simple insertion/rotation movement.

In the illustrated embodiment, two projections 18 are provided but it is also possible to have more than two projections 18. Also, it is possible to provide only a continuous projection that extends from the rim on one side across the center of the end disk 16 up to the opposite rim of the recess 17. Moreover, it is also possible to provide the two projections 18a and 18b not opposite each other but, for example, at an angle of 90 degrees along the rim of the recess 17. This requires an appropriate configuration of the special tool and prevents that it can be replaced by a single rectangular blade or the like.

Figure 6:
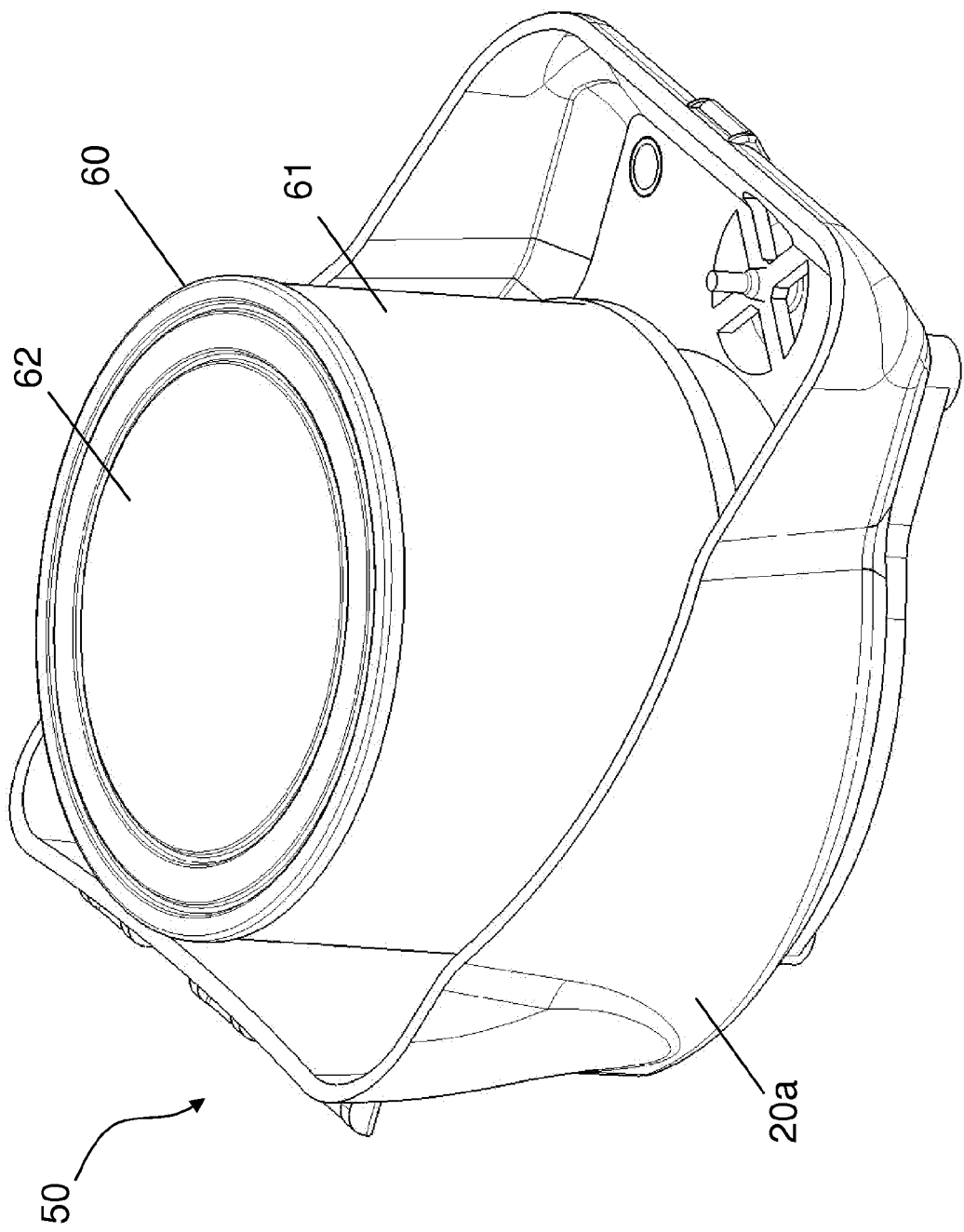
FIG. 6 is a perspective view of a bottom housing shell and a main filter element of a filter arrangement.

The filter arrangement 1 that comprises the filter housing 20 and the filter element 10 effects a two-stage filtration with a cyclone prefiltering action with the cyclone filter stage 21 and a main filtering action with the filter element 10. It is however also possible to provide more filter stages. Such a filter arrangement 50 is schematically illustrated in FIG. 6.

The filter arrangement 50 according to this embodiment has the above described filter housing 20, a secondary filter element that is not shown in more detail, as well as a main filter element 60. The above described filter element 10 can be employed as a secondary filter element so that aspects of the filter housing 20 and the filter element 10 that have already been discussed will not be explained again in this context. FIG. 6 shows only the bottom housing shell 20a of the filter housing 20 as well as the second filter element 60 that is pushed onto the support pipe 21.

In the illustrated arrangement, the filter element 60 serves as a main filter element of a filter arrangement 50 that comprises the main filter element 60 and the secondary filter element. The main filter element 60 is also cylindrical and comprises a cylindrical grid-shaped central tube, not illustrated in detail, that is enveloped by a filter material 61. At the end of the central tube an end disk 62 of polyurethane (PU) or PUR foam is provided which closes off the cylindrical central tube air-tightly.

The filter material 61 of the main filter element 60 is designed for filtering out larger particles and the filter material of the secondary filter element is designed for filtering out finer particles from the air.

After prefiltration with the cyclone filter stage 25 the air to be filtered passes through the filter material 61 of the main filter element 60, passes through the support pipe 21, and penetrates then the filter material of the secondary filter element in order to then be guided outwardly through the air outlet opening at the bottom of the bottom housing shell 20a. Accordingly, a three-stage filtration is provided.

The main filter element 60 can be pushed into and removed from the support pipe 21 by hand with a simple movement so that the exchange can be done quickly and simply. In this connection, because of the configuration of the secondary filter element in the above described way, it is ensured that for complete exchange of the filter arrangement a special tool is required so that proper maintenance is ensured.

In an advantageous embodiment, the support pipe 21 can serve simultaneously as a central pipe of the main filter element 60. Accordingly, an additional component can be avoided which enables an even more cost-efficient realization of the filter arrangement.

The above described embodiment is only to be understood as an exemplary one and other configurations are conceivable that are also meant to be encompassed by the scope of protection. For example, the torque transmission device can also be provided in the end disk as a polygonal recess that has no rotation symmetry. Moreover, it is also possible that as a torque transmission device several recesses are provided in the end disk. Moreover, it is possible that the torque transmission device is designed as a projection or projections on the end disk that has/have no rotational symmetry. With these or other geometries, it can also be ensured that the torque transmission device interacts in accordance with the key-and-lock principle with a tool and, without it, cannot be mounted or only mounted with difficulty.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. An filter air filter element (10) comprising:
   a cylindrical central tube (11);
   an end disk (16) formed monolithically in one-piece as a unitary component with the cylindrical central tube (11) and closing off a first axial end of the cylindrical central tube (11) and covering an axial end face of the filter element;
   a filter material (12) arranged on and covering a cylindrical outer surface of the cylindrical central tube (11);
   a torque transmission device (18) formed on the end disk (16) of the central tube (11), the torque transmission device operable to transmit torque from a tool to the air filter element (10);
   a fastening device (14) formed on or secured onto an opposing second axial end of the central tube (11), the fastening device (14) operable to detachably secure the filter element (10) into an interior of a filter housing cylindrical support body (21) formed in an interior of the filter housing, the cylindrical support body (21) cylindrically surrounding a radial exterior of the air filter element, the detachable securing accomplished by an insertion/rotation movement of the fastening device relative to the support body.

2. The air filter element according to claim 1, wherein the torque transmission device (18) is formed as a projection or recess that has no rotational symmetry relative to the cylinder axis of the central tube (11).

3. The air filter element according to claim 1, wherein the end disk includes an inwardly recessed tub-shaped recess (17);
   wherein the torque transmission device is arranged at and formed on or secured to a bottom of the tub-shaped recess.

4. The air filter element according to claim 1, wherein the torque transmission device (18) includes at least two projections that are provided, positioned opposite each other, on a rim of the recess (17).

5. The air filter element according to claim 2, wherein the end disk includes a rim surrounding an inwardly recessed tub-shaped recess (17) spaced axially inwardly from the rim;
   wherein the torque transmission device (18) includes at least two projections that are provided, positioned opposite each other, on a rim of the recess (17), the at least two projections projecting axially outwardly away from the filter element, the at least two axial projections arranged on a bottom of the tub-shaped recess.

6. A filter housing (20) for receiving an air filter element according to claim 1, the filter housing comprising:
   a top housing part (20b);
   a bottom housing part (20a) detachably secured to the top housing part (20);
   wherein the filter element according to claim 1 is arranged within the filter housing;
   wherein the bottom housing part has an air-permeable cylindrical support body (21) secured to the housing in an interior of the filter housing, the cylindrical support body having an end arranged at and facing an interior of bottom housing part (20a);

a housing associated fastening device (24) secured to the bottom housing part and within a radial interior of the bottom housing part air-permeable cylindrical support body (21);

wherein the cylindrical support body (21) cylindrically surrounds a radial exterior of the air filter element (10);

wherein the housing associated fastening device (24) interacts with and engages with a filter-associated fastening device (14) of the air filter element for fastening the air filter element (10) by means of an insertion/rotation movement.

7. The filter housing according to claim 6, wherein the bottom housing part (20*a*) is monolithically formed together with the cylindrical support body (21) as a one-piece unitary component.

8. The filter housing according to claim 6, wherein the cylindrical support body (21) is formed as an air-permeable grid.

9. A filter arrangement for a portable hand-held power tool, with an air filter element (10) according to claim 1, which is mounted in a filter housing (20), comprising:
the air filter element (10) according to claim 1;
the filter housing comprising:
a to housing part (20*b*);
a bottom housing part (20*a*) detachably secured to the to housing part (20);
wherein the filter element according to claim 1 is arranged within the filter housing;
wherein the bottom housing part has an air-permeable cylindrical support body (21) secured onto the interior of the bottom housing part and having an end arranged at and facing an interior of the bottom housing part (20*a*);
a housing associated fastening device (24) secured to the bottom housing part and within a radial interior of the bottom housing part air-permeable cylindrical support body (21);
wherein the cylindrical support body (21) cylindrically surrounds a radial exterior of the air filter element (10);
wherein the housing associated fastening device (24) interacts with and engages with a filter-associated fastening device (14) of the air filter element for fastening the air filter element (10) by means of an insertion/rotation movement.

10. The filter arrangement according to claim 9, wherein the filter element (10) is received completely and positively into the interior of the support body (21).

11. The filter arrangement according to claim 9, further comprising
a second cylindrical filter element (60) arranged on and encircling an exterior of the support body (21);
wherein the support body (21) forms a central tube of the second cylindrical filter element (60).

12. The air filter element according to claim 5, wherein an annular first seal (13) is arranged on an axially outer side of the rim of the end disk (16) and on an axial end of the filter material (12);
wherein the annular first seal (13) secures the filter material (12) onto the central tube.

\* \* \* \* \*